United States Patent [19]

Miyano

[11] Patent Number: 5,343,731
[45] Date of Patent: Sep. 6, 1994

[54] SEMICONDUCTOR ACCELEROMETER
[75] Inventor: Soichiro Miyano, Tokyo, Japan
[73] Assignee: NEC Corporation, Tokyo, Japan
[21] Appl. No.: 955,062
[22] Filed: Oct. 1, 1992
[30] Foreign Application Priority Data
  Oct. 2, 1991 [JP] Japan ................... 3-254036
[51] Int. Cl.⁵ .............................. G01P 21/02
[52] U.S. Cl. ........................................ 73/1 D
[58] Field of Search .............. 73/2, 1 D; 324/511, 324/537, 549

[56] References Cited
U.S. PATENT DOCUMENTS

| | | | |
|---|---|---|---|
| 4,246,566 | 1/1981 | Endo et al. | 340/450.2 |
| 4,895,021 | 1/1990 | Ishizeki | 73/2 |
| 5,103,667 | 4/1992 | Allen et al. | 73/1 D |

FOREIGN PATENT DOCUMENTS

| | | | |
|---|---|---|---|
| 0368446 | 5/1990 | European Pat. Off. | 73/2 |
| 4142425 | 7/1992 | Fed. Rep. of Germany | 73/2 |

OTHER PUBLICATIONS

"Understanding Silicon Accelermeters", by Henry V. Allen, et al., 10 pages, text beginning with A new class of sensors . . . on the first page and ending with . . . David Aupers. on the last page.
"A Batch-Fabricated Silicon Accelerometer", by L. M. Roylance, et al., IEEE Transactions on Electron Devices, vol. ED-26, No. 12, Dec. 1979, pp. 1911–1917.

Primary Examiner—Robert Raevis
Attorney, Agent, or Firm—Burns, Doane, Swecker & Mathis

[57] ABSTRACT

Provided is a novel semiconductor accelerometer possessing an acceleration sensing feature including gage resistors on beams and a detecting feature for abnormality of the acceleration sensing feature in which the novel structure is manifested. The detection of abnormality of the acceleration sensing feature is accomplished by comparing a voltage applied to a bridge circuit comprising the gage resistors with a predetermined reference voltage. The detecting feature essentially comprises a comparator and a generator. The comparator compares the voltage applied to the bridge circuit with a predetermined reference voltage supplied from the voltage generator. When the gage resistors has abnormality in the sensing performance, the applied voltage takes a higher voltage than that in the normal state. Therefore, the comparison of the above both voltages permits recognizing the gage resistors to have abnormality. The result of the comparison may be transmitted either through the amplifier to a common terminal to the acceleration signals or through an executive output circuit to an executive output terminal.

5 Claims, 7 Drawing Sheets

SEMICONDUCTOR ACCELEROMETER

BACKGROUND OF THE INVENTION

The invention relates to a semiconductor accelerometer, and more particularly to a semiconductor accelerometer with an additional feature for detecting abnormalities in an acceleration sensing performance due to damage of gage resistors on beams.

In the prior art, typical accelerometers may generally be fabricated by the following steps. A semiconductor substrate is processed to form beams and a mass. The beams are formed thereon with a strain gage comprising four resistors for detecting strain at the beams.

When the mass is subjected to a force caused by acceleration in a vertical direction, the mass is oscillated in the vertical direction. As a result of the oscillation, a strain is caused at the beam portion. Thus, the resistivity of the each gage resistors provided on the beams is varied, after which the variation of the resistivity is detected and retrieved as electrical signals.

FIG. 1 illustrates a block circuit diagram of a semiconductor accelerometer in the prior art. The conventional semiconductor accelerometer 1a includes a strain gage 2 comprising four gage resistors forming a Wheatstone bridge circuit, a power supply circuit 3 for supplying a power to the strain gage 2, an amplifier 4a for amplifying and outputting acceleration detecting signals output from the bridge circuit for detecting a variation of the resistivity of the gage resistors 2. The power supply circuit 3 and the bridge circuit 2 serving as the strain gage are connected in series to one another between a power supply terminal 8 and a ground signal terminal 11. The amplifier 4a amplifies a potential difference between output terminals of the bridge circuit and outputs the acceleration signals to an acceleration signal terminal 10.

FIG. 2A is a plan view illustrating a semiconductor accelerometer chip 16. FIG. 2B is a cross sectional elevation view illustrative of the accelerometer of FIG. 2A. In the typical semiconductor accelerometer chip, the gage resistors 2 are formed on the beams 20. When the chip is accelerated and oscillated in a vertical direction, the mass 19 is subjected to a force caused by the acceleration. As a result of the force, a strain is generated at the beams 20 with which the resistivity of the each gage resistors 2 formed on the beams is varied. Then, the balance loss of the bridge circuit comprising the gage resistors appears. The bridge circuit 2 generates a potential difference between output terminals. The potential difference is likely to be associated with the acceleration. The amplifier 4a amplifies the potential difference and outputs electrical signals (to each of four bonding pads 17 to which terminals of the bridge circuit 2 are respectively connected) which are provided for connection to external devices. The chip is further provided with grooves 18.

The power supply circuit 3 may includes an additional feature for controlling a current to be supplied to the gage resistors 2 according to an ambient temperature thereby enabling compensation of the sensitivity of the gage resistors 2 which depends upon the ambient temperature. While the conventional accelerometer chip 16 illustrated in FIG. 2A includes the bridge circuit comprising the gage resistors 2 only, the chip 16 may further include the power supply circuit 3 and the amplifier 4a by using the semiconductor integration processes.

Since the beam 20 is so formed as to be extremely thin, the beams 20 are frequently accidentally broken and disconnected by overloads. The result of this is that the gage resistor 2 which is provided on the disconnected beam 20 is also broken. Under such circumstances, the accelerometer is no longer able to fulfill the correct detection of the acceleration. It is, however, difficult for the prior art to recognize that the gage resistors are damaged from the output signals only. The reason for this is as follows. The output signals are likely to depend upon the characteristic of the amplifier 4a. As an example, if the bridge circuit loses two gage resistors at the high voltage side connected to the power supply circuit 3, the output terminals of the bridge circuit are commonly taken to ground potential. Then, an offset voltage remains across input terminals of the amplifier 4a and is outputted through the amplifier 4a as output signals.

With respect to the structure, the mass is supported at its opposite ends by extremely thin beams having a thickness of 10 to 20 micrometers. Such structure allows the beams to be accidentally disconnected or broken due to overshock and twist. When this happens, the accelerometer is no longer able to perform a correct sensing of the acceleration, which is considerable. Although this accident should promptly be recognized, the conventional accelerometer has no detecting capability.

SUMMARY OF THE INVENTION

Accordingly, it is a primary object of the present invention to provide a novel semiconductor accelerometer which is capable of recognizing an abnormal sensing performance.

It is a further object of the present invention to provide a novel semiconductor accelerometer having an additional feature for detecting abnormality in gage resistors.

The above and other objects, features and advantages of the present invention will be apparent from the following description.

In accordance with the present invention, a novel semiconductor accelerometer has an acceleration sensing feature and a damage detecting feature. A chip body of the accelerometer comprises at least one mass and beams for supporting the mass, which are provided at opposite ends of the mass. The chip body has the same structure as the prior art. The acceleration sensing feature is also analogous to the prior art. The novel structure is manifested in the additional feature for detecting abnormality in the acceleration sensing feature.

For the acceleration sensing feature, gage resistors forming a bridge circuit are provided on the beams so as to sense strains at the beams. A power supply circuit is connected in series to the gage resistors so that the power supply circuit supplies a power received from a power terminal to the bridge circuit comprising the gage resistors. An amplifier is connected to output sides of the bridge circuit to receive a potential difference as voltage signals, which is caused at the output sides, in addition to amplifying and outputting the voltage signals. Since the output voltage signals depend upon the acceleration, the measurement of acceleration in the vertical direction may be accomplished.

For the detecting feature, the detection of abnormality of the acceleration sensing feature is accomplished by comparing a voltage applied to the bridge circuit comprising the gage resistors with a predetermined reference voltage. To realize the above comparison, the detecting feature essentially comprises a comparator and a generator. The comparator compares the voltage applied to the bridge circuit comprising the gage resistors by the power supply circuit with the predetermined reference voltage. The generator generates the predetermined reference voltage and supplies it to the comparator.

For the circuit structure, two input terminals of the comparator are respectively connected to the input side of the bridge circuit and the generator. When the gage resistors have an abnormality in the sensing performance, the voltage at the input side of the bridge circuit tends to be higher than that in the normal state. Therefore, the comparison of the voltage at the input side of the bridge circuit with the reference voltage permits recognizing the gage resistors forming the bridge circuit to have an abnormality in the sensing performance. The result of the comparison may be transmitted through the amplifier to a common terminal to the acceleration signals. Alternatively, the result may be transmitted through an executive output circuit to an executive output terminal.

BRIEF DESCRIPTION OF THE DRAWINGS

Preferred embodiments of the present invention will hereinafter fully be described in detail with reference to the accompanying drawings.

PREFERRED EMBODIMENTS OF THE INVENTION

Figure 4:
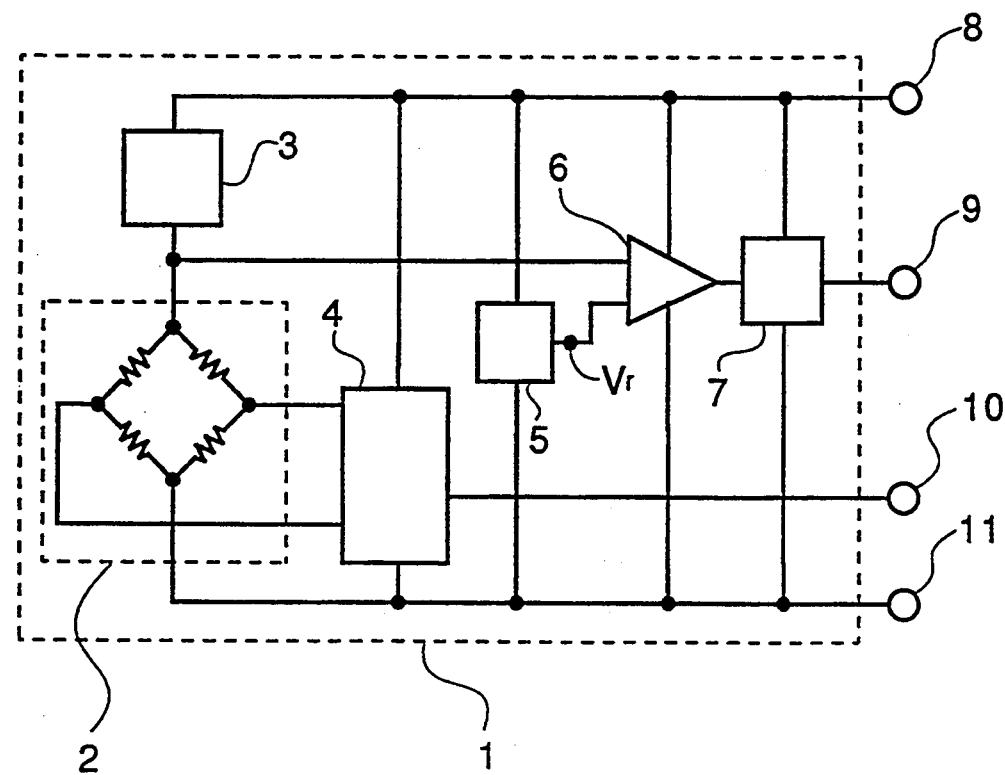
FIG. 4 is a block circuit diagram of a novel semiconductor accelerometer of one embodiment according to the present invention.

A first embodiment of the present invention will now be described with reference to FIG. 4. In this embodiment, the structure of the semiconductor accelerometer chip comprises a mass, beams provided at opposite ends of the mass and frames to support the mass through the beams, which is analogous to the structure in the prior art.

With respect to circuit structure of a novel semiconductor accelerometer 1, gage resistors 2 forming a Wheatstone bridge circuit are provided between a power terminal 8 and a ground signal terminal 11 to serve as a strain gage. A power supply circuit 3 is connected in series to the bridge circuit at its input side so as to supply the gage resistors 2 with a power. An amplifier 4 is connected in parallel to the bridge circuit so that the amplifier 4 may be operated by a power received from the power terminal 8. Input terminals of the amplifier 4 are connected to an output side of the bridge circuit so as to receive and amplify a potential difference caused between output terminals of the bridge circuit. The amplifier 4 at its output side is also connected to an acceleration signal output terminal 10 so that the amplified acceleration signals are received from the acceleration signal output terminal 10. A reference voltage generator 5 is connected in parallel to the bridge circuit so as to be operated by the power received from the power terminal 8. The reference voltage generator 5 generates a predetermined reference voltage $V_r$. A comparator 6 is connected in parallel to the bridge circuit to be operated by the power received from the power terminal 8. Input terminals of the comparator 6 are respectively connected to the input side of the bridge circuit and an output terminal of the reference voltage generator 5 so as to compare a voltage applied to the bridge circuit with the predetermined reference voltage $V_r$ received from the reference voltage generator 5. A damage signal output circuit 7 receives the result of the comparison by the comparator 6 and outputs as logic signals a damage output signal to a damage output signal terminal 9. When the applied voltage of the bridge circuit is larger than the predetermined reference voltage $V_r$, the logic signal is "0". When the applied voltage of the bridge circuit is smaller than the predetermined voltage $V_r$, the logic signal is "1".

With regard to the operation in a normal state of the above circuit, when no damage exists at all gage resistors 2, the novel accelerometer is normally operated. When the novel accelerometer is accelerated and oscillated in the vertical direction, the mass accommodated in the accelerometer chip is applied with a vertical force by which the beams are subjected to strain. As a result of the strain, the resistivity of each of the gage resistors 2 existing on the beams is varied. This allows the balance of the bridge circuit comprising the gage resistors 2 to be lost with which a potential difference depending upon the applied acceleration is generated between the output terminals of the bridge circuit. The potential difference is received by the amplifier 4 followed by amplification, after which the amplified voltage is transmitted as acceleration signals to the acceleration signal terminal 10.

With respect to the operation in an abnormal state of the above circuit, if the beams are accidentally disconnected or damaged, gage resistors 2 are also damaged or broken. In this case, typical broken states of the gage resistors 2 are illustrated in FIG. 3A to 3D. Assuming that the resistivity of each of the gage resistors 2 forming the bridge circuit is $R_g$, the impedance of the power supply circuit 3 is $R_s$, the power voltage is $V_{cc}$, the potential $V_g$ of the input of the bridge circuit in the normal state is given by $$V_g = (R_g/(R_s+R_g)) \times V_{cc}.$$

Figure 1:
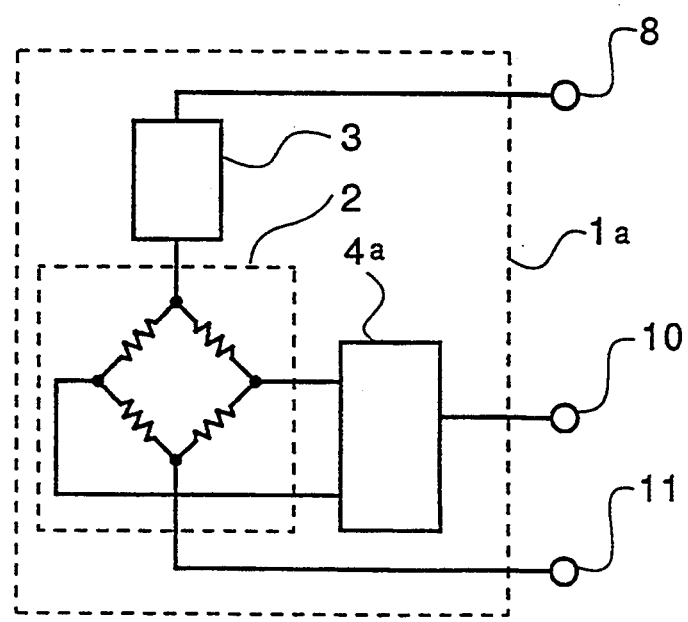
FIG. 1 is a block circuit diagram of the conventional semiconductor accelerometer.
Figure 2A:
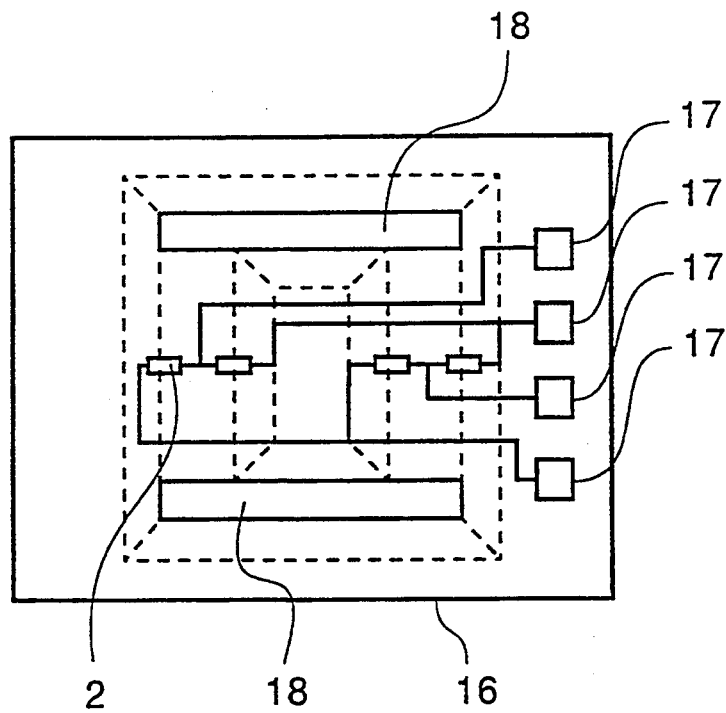
FIG. 2A is a plan view illustrative of the conventional semiconductor accelerometer chip.
Figure 2B:
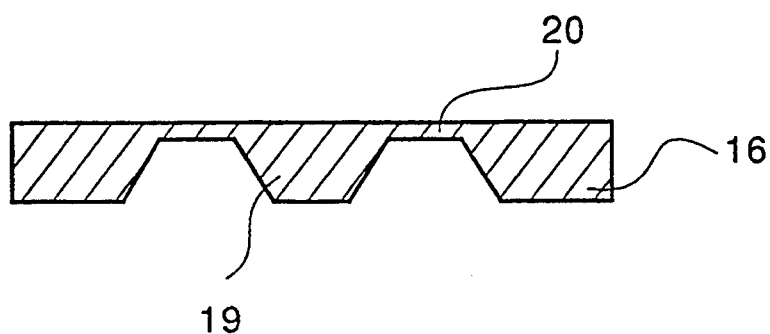
FIG. 2B is a cross sectional elevation view illustrative of the conventional semiconductor accelerometer chip illustrated in FIG. 2A.
Figure 3A:
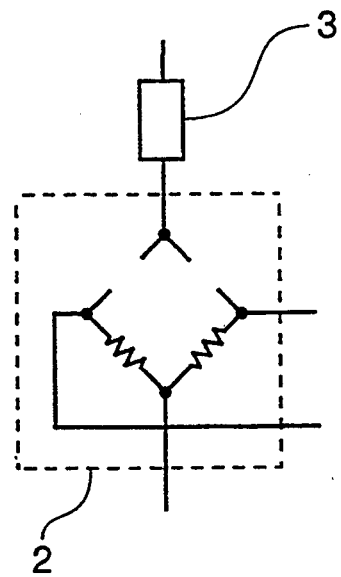
FIG. 3A to 3D are circuit diagrams illustrative of a variation of broken states of gage resistors formed on beams in the semiconductor accelerometer chip.
Figure 3B:
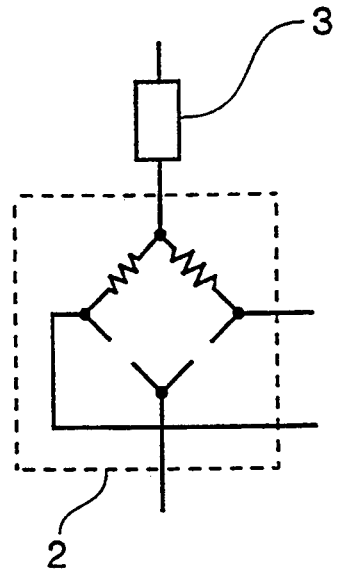

When the disconnection of the gage resistors 2 has occurred and the gage resistors 2 have the states of FIG. 3A and 3B, the potential difference $V_g$ is given by $$V_g = V_{cc}.$$

Figure 3C:
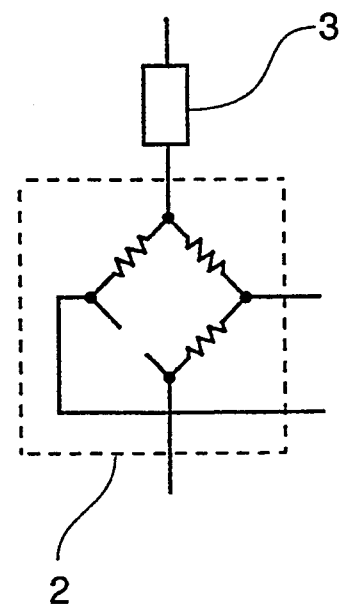
Figure 3D:
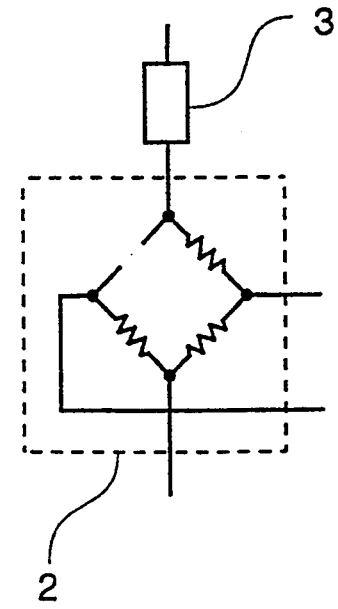

When the gage resistors 2 have the states of FIGS. 3C and 3D, the potential difference $V_g$ is given by $$V_g = (R_g/(R_s + 2R_g)) \times V_{cc}.$$

In the above cases, an abnormal potential difference, or voltage, is caused at the output sides of gage resistors 2 forming the bridge circuit as compared with the normal state. Thus, the comparison of the potential difference $V_g$ with the predetermined reference voltage V by the comparator 6 permits the detection of the damage of the gage resistors 2, or an abnormality in the acceleration sensing performance.

Figure 5:
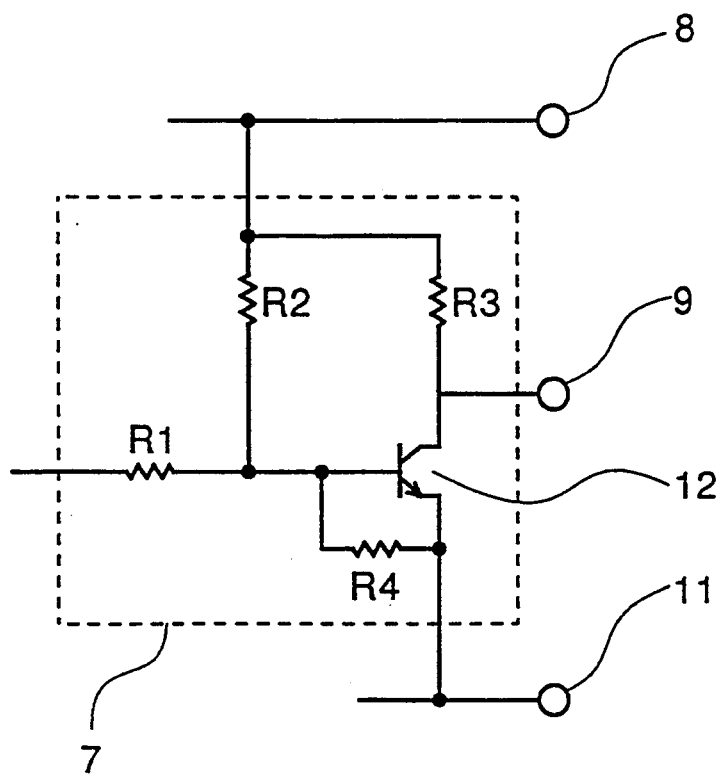
FIG. 5 is a fragmentary circuit diagram of an output circuit for outputting damage detecting signals involved in a novel semiconductor accelerometer according to the present invention.

Referring to FIG. 5, the damage signal output circuit 7 comprises a bipolar transistor 12 and resistors R1 to R4. The damage signal output circuit 7 receives the result of the comparison from the comparator 6. The damage signal output circuit 7 is formed of an open collector circuit as illustrated in FIG. 5. When the result of the comparison is that the potential difference $V_g$ of the gage resistors 2 is higher than the reference voltage $V_r$, the damage output signal is taken into the logic "0" and a voltage lower than approximately 0.4V is outputted. When the potential difference $V_g$ of the gage resistors 2 is lower than the reference voltage $V_r$, the damage output signal is taken into the logic "1" and the same voltage as the power voltage is outputted. The damage output circuit 7 thus permits damage to the beams to be detected.

Figure 6:
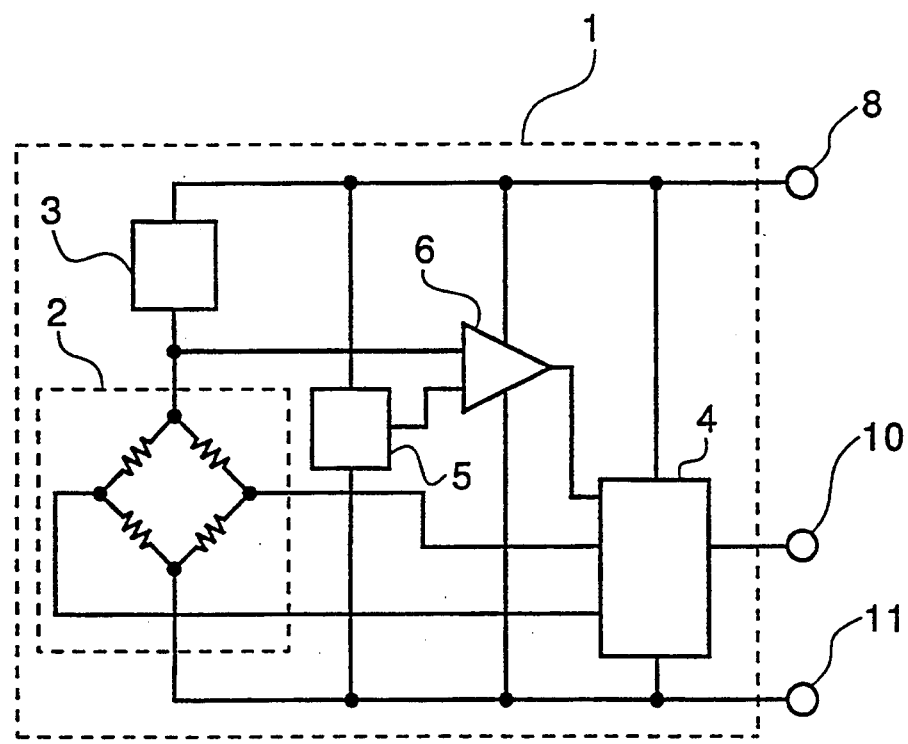
FIG. 6 is a block circuit diagram of a novel semiconductor accelerometer of another embodiment according to the present invention.

A second embodiment of the present invention will subsequently be described with reference to FIG. 6. In this embodiment, the semiconductor accelerometer chip has the same structure as the first embodiment.

With respect to the circuit structure of a novel semiconductor accelerometer 1, gage resistors 2 forming a Wheatstone bridge circuit are provided between a power terminal 8 and a ground signal terminal 11 to serve as a strain gage. A power supply circuit 3 is connected in series to the bridge circuit at its input side so as to supply the gage resistors 2 with power received from the power terminal 8. A reference voltage generator 5 is connected in parallel to the bridge circuit so as to be operated by a power received from the power terminal 8. The reference voltage generator 5 generates a predetermined reference voltage $V_r$. A comparator 6 is connected in parallel to the bridge circuit to be operated by the power from the power terminal 8. Input terminals of the comparator 6 are respectively connected to the input side of the bridge circuit and an output terminal of the reference voltage generator 5. The comparator 6 compares a voltage applied to the bridge circuit $V_g$ with the predetermined reference voltage $V_r$ received from the reference voltage generator 5. An amplifier 4 is connected in parallel to the bridge circuit so that the amplifier 4 may be operated by the power received from the power terminal 8. Three input terminals of the amplifier 4 are respectively connected to output side terminals of the bridge circuit and to an output terminal of the comparator 6. The amplifier 4 receives and amplifies a potential difference generated between output terminals of the bridge circuit. The amplifier 4 also receives and amplifies the result of comparison by the comparator 6. The amplifier 4 at its output side is connected to an acceleration signal output terminal 10 so that the amplified acceleration signals are fetched from the acceleration signal output terminal 10.

Figure 7:
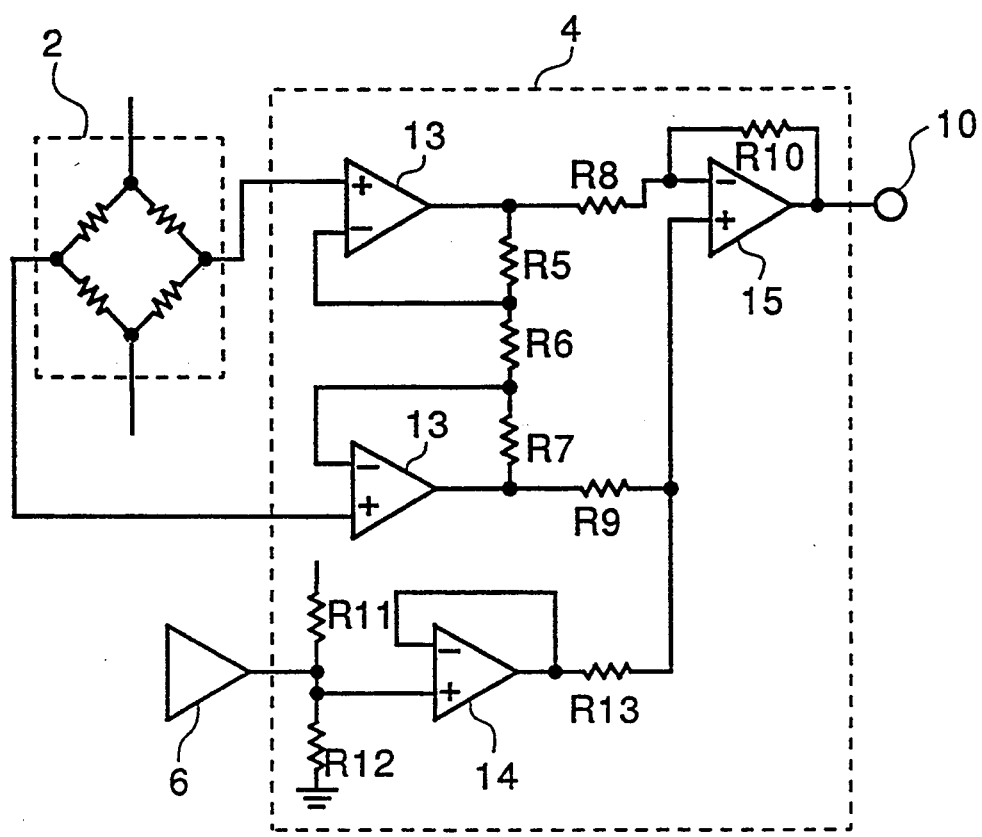
FIG. 7 is a block diagram of amplifier circuits involved in a novel semiconductor accelerometer of another embodiment according to the present invention.

Referring to FIG. 7 illustrating circuit structures of the amplifier 4, the amplifier 4 comprises a plurality of operational amplifiers 13 and 14 and resistors R5 to R13. The two operational amplifiers 13 receive and amplify the potential difference generated at the output terminals of the gage resistors 2 forming the bridge circuit. The operational amplifier 14 receives and amplifies the result of the comparison by the comparator 6. The operational amplifier 15 receives and amplifies the resultant output signals transmitted from the operational amplifiers 13 and 14. In this case, the accelerometer requires no additional terminal except the power, ground and signal output terminals.

In the operations of the amplifier circuits, the above amplifier 4 may be so constructed that the output voltage is taken to ground potential when the potential difference at the output terminals of the bridge circuit is higher than the reference voltage $V_r$. Since the comparator 6 comprises integrated circuits of open collector circuits, the output voltage from the amplifier 4 in the no acceleration state corresponds to a voltage divided from the power voltage $V_{cc}$ by resistors R11 and R12. In an abnormal state, since an output transistor accommodated in the comparator 6 is taken into the ON state, a middle point voltage of the resistors R11 and R12 is equal to a saturation collector-emitter voltage of the output transistor. Thus, the output voltage of the amplifier 4 also becomes the same voltage. In the normal state, the output voltage from the amplifier 4 never takes such low values. Therefore, when such low voltage is outputted, damage of any of the gage resistors is detected and the accelerometer is no longer capable of correct performance.

Needless to say, the voltage values of the output signals in the both normal and abnormal states may be varied on condition that the abnormal state of the accelerometer performance is distinguishable from the output signals. In addition, the circuit structures are also variable.

Whereas modifications of the present invention will no doubt be apparent to a person of ordinary skill in the art, it is to be understood that the embodiments shown and described by way of illustration are by no means intended to be considered in a limiting sense. Accordingly, it is to be intended by the claims to cover all modifications of the invention which fall within the spirit and scope of the invention.

What is claimed is:

1. A semiconductor accelerometer, comprising:
    a body including at least one mass supported at its opposite end by beams;
    means on said beam for sensing strains of said beams, said sensing means generating a voltage corresponding to accelerations;
    means for amplifying said voltage as voltage signals received from said sensing means to detect accelerations; and
    means for detecting abnormalities in said sensing means by comparing a voltage applied to said sensing means with a predetermined reference voltage, wherein said amplifying means outputs detecting signals received from said detecting means to a common terminal which also outputs said voltage corresponding to accelerations.

2. The semiconductor accelerometer as claimed in claim 1, wherein said amplifying means outputs a predetermined constant voltage to said common terminal when an abnormality in said sensing means is detected.

3. The semiconductor accelerometer as claimed in claim 1, wherein said sensing means comprises a plurality of gage resistors forming a bridge circuit.

4. The semiconductor accelerometer as claimed in claim 1, further comprising a circuit for supplying power to said gage resistors, said power supply circuit being connected to series to said bridge circuit.

5. The semiconductor accelerometer as claimed in claim 1, wherein said detecting means comprises a generator for generating said reference voltage and a comparator for comparing said voltage applied to said sensing means with said reference voltage fetched from said generator.

* * * * *